United States Patent
Webber et al.

(10) Patent No.: US 11,966,239 B2
(45) Date of Patent: Apr. 23, 2024

(54) CURRENT CONTROL SYSTEMS AND WAVE POOLS INCLUDING SAME

(71) Applicant: LIQUID TIME LTD, New South Wales (AU)

(72) Inventors: Gregory Mark Webber, New South Wales (AU); Daniel Webber, New South Wales (AU)

(73) Assignee: LIQUID TIME LTD, New South Wales (AU)

(*) Notice: Subject to any disclaimer, the term of this patent is extended or adjusted under 35 U.S.C. 154(b) by 479 days.

(21) Appl. No.: 17/162,650

(22) Filed: Jan. 29, 2021

(65) Prior Publication Data

US 2021/0157342 A1 May 27, 2021

Related U.S. Application Data

(63) Continuation-in-part of application No. PCT/AU2019/050806, filed on Jul. 31, 2019.

(30) Foreign Application Priority Data

Jul. 31, 2018 (AU) .................... 2018902787

(51) Int. Cl.
*G05D 7/06* (2006.01)
*E04H 4/00* (2006.01)

(52) U.S. Cl.
CPC ......... *G05D 7/0682* (2013.01); *E04H 4/0006* (2013.01)

(58) Field of Classification Search
CPC ............... E04H 4/0006; G05D 7/0682

USPC .............................................................. 4/491
See application file for complete search history.

(56) References Cited

U.S. PATENT DOCUMENTS

| | | | |
|---|---|---|---|
| 4,290,153 A | 9/1981 | Kockerols et al. | |
| 8,992,782 B2 * | 3/2015 | Novak | E02B 15/08 210/776 |
| 2010/0124460 A1 * | 5/2010 | Fricano | E04H 4/0006 4/491 |
| 2012/0037248 A1 | 2/2012 | Hof | |
| 2018/0209159 A1 | 7/2018 | Perslow | |

FOREIGN PATENT DOCUMENTS

| | | | |
|---|---|---|---|
| AU | 2008217659 A1 | 8/2008 | |
| EP | 732468 A1 * | 9/1996 | ........... E04H 4/0006 |
| WO | 2006060866 A1 | 6/2006 | |
| WO | 2014190314 A2 | 11/2014 | |
| WO | 2015082871 A1 | 6/2015 | |

OTHER PUBLICATIONS

EP 732468 (Year: 1996).*

* cited by examiner

*Primary Examiner* — Lauren A Crane
(74) *Attorney, Agent, or Firm* — BakerHostetler

(57) ABSTRACT

A current control system for a wave pool comprising: an array of flow meters disposed within said wave pool; a complimentary array of current generators disposed within said wave pool; and a processor operable to receive data relating to currents within said wave pool from said array of flow meters, wherein said processor is operable to control currents generated by said array of current generators in response to said data relating to currents within said wave pool received from said array of flow meters.

20 Claims, 3 Drawing Sheets

CURRENT CONTROL SYSTEMS AND WAVE POOLS INCLUDING SAME

CROSS REFERENCE TO RELATED APPLICATIONS

This application is a continuation in part of PCT Patent No. PCT/AU2019/050806, filed Jul. 31, 2019 which claims priority to Australian Patent Application No. 2018902787, filed Jul. 31, 2018, the contents of each of which are incorporated herein by reference in their entirety.

FIELD OF INVENTION

The present invention relates to current control systems, particularly those for controlling currents developed in wave pools. The invention also relates to wave pools that include such current control systems. The invention further relates to methods for controlling currents within a wave pool, for example to limit or eliminate unwanted currents within the wave pool, or to produce favorable currents within the wave pool to enhance wave shape.

BACKGROUND ART

Wave pools developed for recreational surfing are becoming increasingly popular. Such wave pools have the advantage of being able to produce waves in a relatively predictable manner as compared with open water, such as in the ocean. Wave pools necessarily occupy a confined space in which currents have the potential to either compromise or improve wave production, depending on the operator's ability to control the movement of water within the pool.

The elimination of unfavorable currents caused by water displacement is discussed to some extent in International Patent Publication No. WO2006/060866 A1. This publication discusses a wave pool that includes an impeller which generates a current in the water in a direction opposite to the direction of movement of a hull that is being used to create waves in the wave pool. It is suggested that this enables waves to be generated more regularly, increasing wave frequency which increases the number of waves that can be ridden in any given period allowing more users to enjoy the facility.

However, since currents caused by wave action will vary in velocity across the breadth of the wave pool channel, while a uniform current in the opposite direction may decrease or reverse the wave-created current, it will also have side effects whereby the mismatch of a uniform reverse current with the varying wave-created currents will result in additional turbulence in some areas.

In certain embodiments the present invention aims to provide an alternative current control system that may be used to eliminate, or at least ameliorate undesirable wave-created currents within a wave pool. In certain embodiments the present invention aims to provide a means for optimizing wave shape by influencing the flow of water within a wave pool.

The subject matter claimed herein is not limited to embodiments that solve any disadvantages or that operate only in environments such as those described above. Rather, this background is only provided to illustrate exemplary technology areas where some embodiments described herein may be practiced.

Various aspects and embodiments of the invention will now be described.

SUMMARY OF INVENTION

As mentioned above, the present invention relates generally to current control systems, particularly those for controlling currents developed in wave pools, wave pools that include such current control systems, and methods for controlling currents within a wave pool, for example to negate or eliminate currents within the wave pool, or to produce currents within the wave pool to enhance wave shape.

According to one aspect of the invention there is provided a current control system for a wave pool comprising:
 an array of flow meters disposed within the wave pool;
 a complimentary array of current generators disposed within the wave pool; and a processor operable to receive data relating to currents within the wave pool from the array of flow meters,
 wherein the processor is operable to control currents generated by the array of current generators in response to the data relating to currents within the wave pool received from the array of flow meters.

The wave pool may take any suitable form, for example this may be a circular or elliptical wave pool, or may be a straight channel. As such, the positioning of the array of flow meters within the wave pool is not particularly limited. The array of flow meters may be placed across the entire wave pool, or only a portion of the wave pool. This may, for example, depend on a surfing zone within the wave pool, and so on.

In certain embodiments, however, the wave pool comprises a channel section and a shallower gradient section associated with the channel section, and the flow meters are disposed across the surface of the gradient section. According to this embodiment it is preferred that the flow meters also be disposed on a floor of the channel section. More preferably, the flow meters are further disposed at varying depths within the channel section.

Similarly, the location of the array of current generators is not particularly limited and may be somewhat dependent on the form of the wave pool, or whether the wave pool has a surfing zone, and so on.

According to the above example, in which the wave pool comprises a channel section and a shallower gradient section associated with the channel section, the current generators are generally disposed across the surface of the gradient section. The current generators may also be disposed on a floor of the channel section, and may further be disposed at varying depths within the channel section.

The flow meters within the array may take any suitable form. For example, the array of flow meters may comprise an array of turbine flow meters, Doppler flow meters and/or laser flow meters. Likewise, the current generators may take any suitable form. For example, they may include impellers or the like. In a preferred embodiment, the array of current generators comprises an array of jets. Preferably, the jets are multidirectional. This advantageously facilitates forming a current in any direction from any one of the jets in response to currents measured within the wave pool by the flow meters.

In certain embodiments the processor is operable to receive the data relating to currents within the wave pool from the array of flow meters and generate a current velocity profile within at least a portion of the wave pool. In that regard, the processor may rely on software that employs algorithms and formulae to effectively 'fill in' voids based on current fluid dynamics modelling for closed bodies of water. For example, the processor may be operable to cause the array of current generators to generate a corresponding negative current velocity profile within the portion of the wave pool, thereby negating currents within the portion of the wave pool. The processor may be operable to cause the array of current generators to generate a complimentary current velocity profile that modifies waves formed within the wave pool.

In another aspect of the invention there is provided a wave pool comprising a current control system as described in the preceding paragraphs.

In yet another aspect of the invention there is provided a method of controlling currents within a wave pool comprising:

measuring currents within the wave pool with an array of flow meters disposed within the wave pool;

generating a current velocity profile within at least a portion of the wave pool;

based on the current velocity profile, adjusting currents within at least the portion of the wave pool with an array of current generators disposed within the wave pool. The step of generating the current velocity profile may comprise transmitting data relating to currents within the wave pool from the array of flow meters to a processor and generating the current velocity profile based on that data.

The step of adjusting currents within the wave pool may comprise causing the array of current generators to generate a corresponding negative current velocity profile within the portion of the wave pool, thereby negating currents within the portion of the wave pool. This may avoid interaction of following waves with turbulence formed by a preceding wave.

The step of adjusting currents within the wave pool may comprise causing the array of current generators to generate a complimentary current velocity profile that modifies waves formed within the wave pool. For example, this may facilitate desirable interaction of currents formed from preceding waves with subsequently formed waves.

For example, a broad current can be used to counter any currents that form as a result of wave action displacing large volumes of water. By contrast, a narrow current can be used to alter the shape of a wave, by disrupting the advance of a narrow section of the wave. The invention may therefore be used to enhance wave shape, by controlling the breadth, speed and angle of water currents relative to each wave, so that waves can be reshaped in ways akin to the effect of surf zone bathymetry.

BRIEF DESCRIPTION OF ACCOMPANYING DRAWINGS

To further clarify various aspects of some embodiments of the present invention, a more particular description of the invention will be rendered by references to specific embodiments thereof, which are illustrated in the appended drawings. It should be appreciated that these drawings depict only typical embodiments of the invention and are therefore not to be considered limiting on its scope. The invention will be described and explained with additional specificity and detail through the accompanying drawings in which.

DETAILED DESCRIPTION OF THE PREFERRED EMBODIMENTS

Hereinafter, this specification will describe the present invention according to the preferred embodiments. It is to be understood that limiting the description to the preferred embodiments of the invention is merely to facilitate discussion of the present invention and it is envisioned without departing from the scope of the appended claims.

Figure 1:
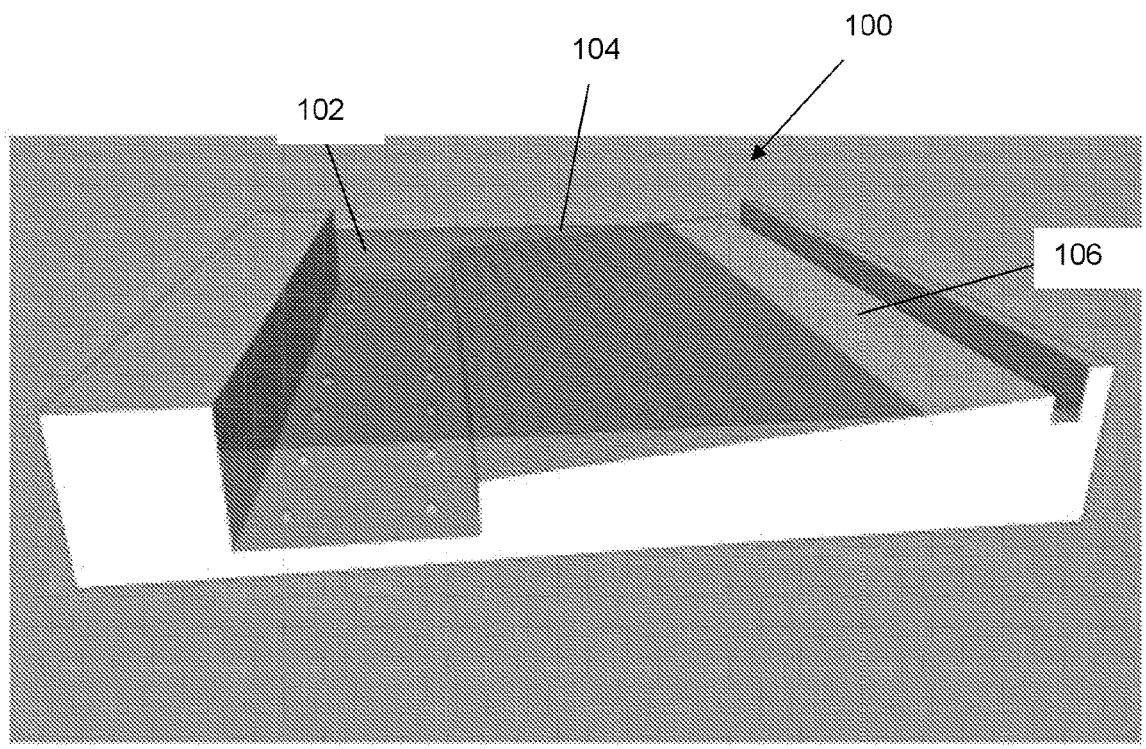
FIG. 1 illustrates a perspective view of a section of a wave pool comprising a current control system.
Figure 2:
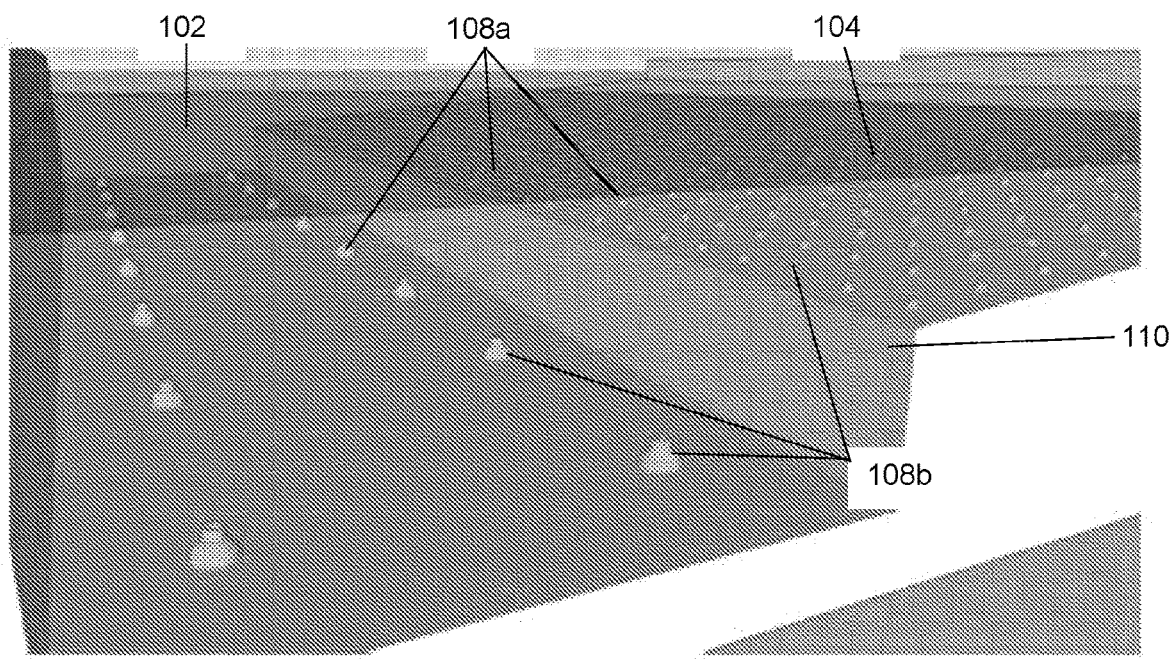
FIG. 2 illustrates a closer view of the section depicted in FIG. 1.
Figure 3A:
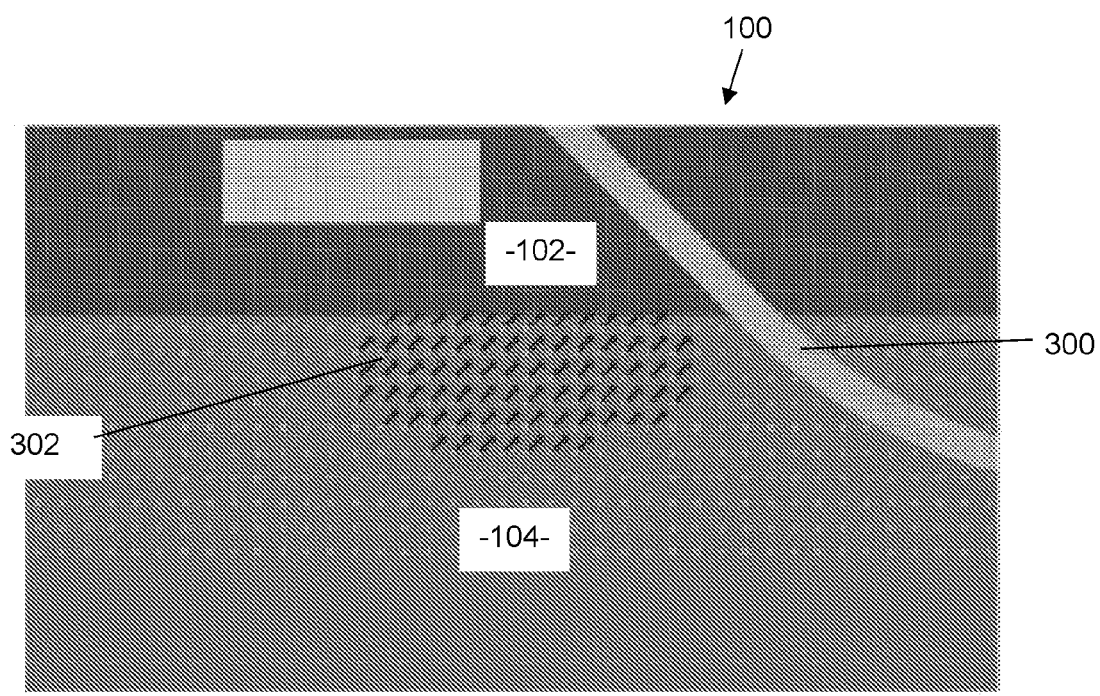
FIGS. 3A to 3D illustrate the impact of jets acting on a wave front.
Figure 3B:
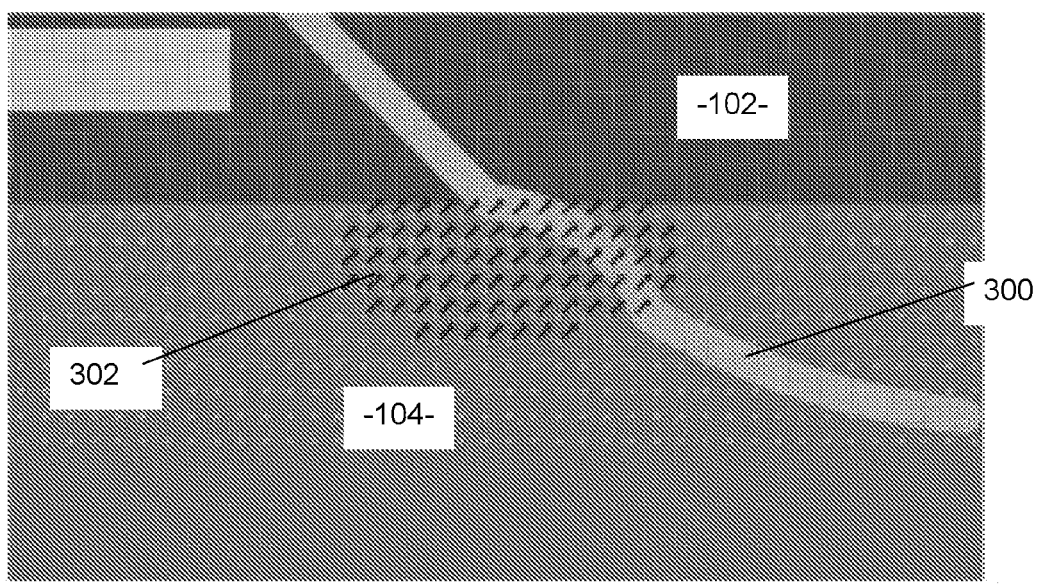
Figure 3C:
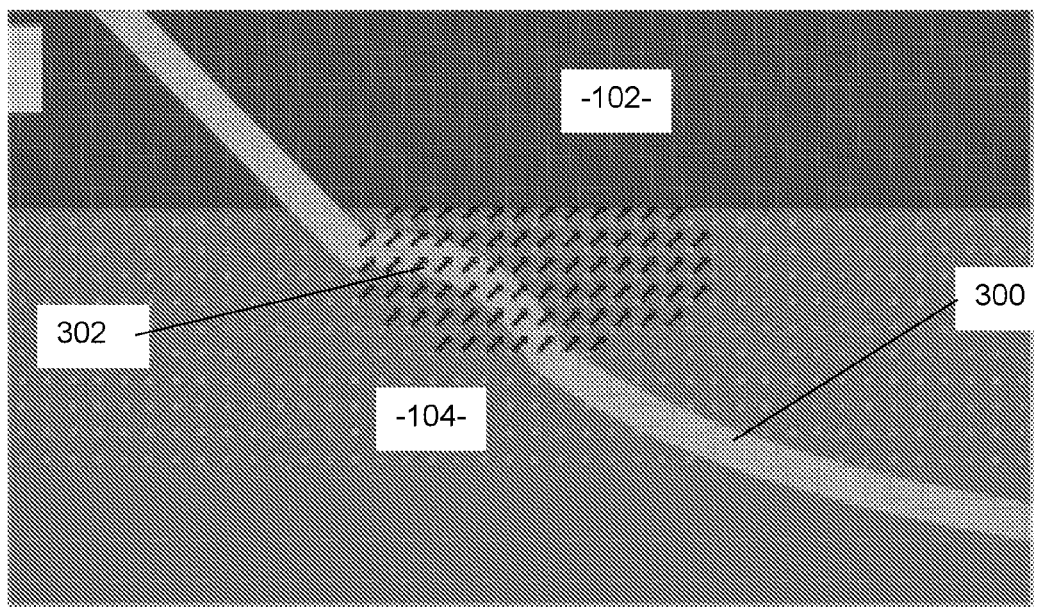
Figure 3D:
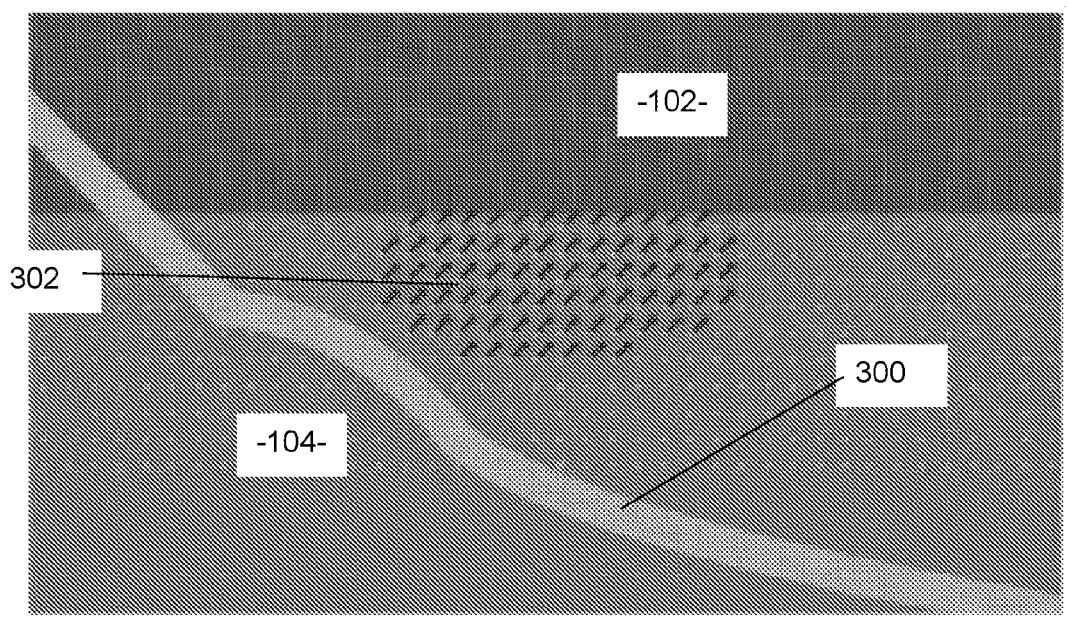

Referring to FIGS. 1 and 2, a section of a wave pool 100 is illustrated. The wave pool 100 includes a channel section 102 and a shallower gradient section 104 associated with the channel section 102. The gradient section 104 therefore resembles a shore line going from deeper to shallower water, ultimately arriving at a shore section 106. Waves generated in the channel section 102 will propagate and break over the gradient section 104, as they do in shore breaks.

An array of flow meters 108a and current-creating jets 108b is disposed on a floor of the channel section 102 and across the surface of the gradient section 104. For ease of reference the array is a combined array in this illustration and each unit may include a flow meter 108a or jet 108b. The array of flow meters 108a and array of jets 108b are not necessarily immediately next to each other since the localized velocity next to individual jets 108b will be higher than the net overall flow. For example, the flow meters 108a may be disposed on the edge of the step 110 facing back towards the shore section 106. Accordingly, the flow meters 108a so positioned may better identify the cone of function beneath the waves generated.

Some or all of the jets 108b may be positionable about a Z-axis and/or an X-Y axis. In this regard, a jet 108b may be moveable such that its outlet can be moved 360 degrees about the Z-axis, which is defined as perpendicular to a surface on which the jet 108b is mounted. Thus, the outlet of jet 108b may be positioned to face any direction along the face of its local surface—in the embodiment of the figures either channel section 102 or gradient section 104.

The Z-axis is vertical when jet 108b is mounted on or in channel section 102 and channel section 102 is a horizontal surface. The Z-axis will deviate from vertical when referring to a jet 108b mounted on or in gradient section 104, as the z-axis is perpendicular to gradient section 104, which in the embodiment of the figures is not horizontal. The orientation of the Z-axis is clear when channel 102 and gradient portion 104 are planar. If the surface about the jets 108b not planar, such as curved, a local area closest to the jet 108b may be evaluated to determine the local orientation of the Z-axis. Accordingly, in many cases, there may be more than one Z-axis among the jets 108b, as each jet 108b may have its own Z-axis according to its local surface.

The X-Y axis is defined by a line lying in a plane that is perpendicular to the Z-axis, and usually parallel with or co-planar with the surface of channel section 102 or gradient section 104 when planar (depending on the particular location of the jet). A local plane about jet 108b may be defined by its nearby surface if the surface in which it is located is not planar. Preferably, jet 108b is moveable from approximately zero degrees to 180 degrees about an X-Y axis, as the flow heads of jets 108b may be built into the surface of channel section 102 or gradient section 104 and level with or just above the waterbody floor of surface 102 or 104.

Accordingly, the ability of jet 108b to be positionable about the Z axis and the X-Y axis as described herein enables the outlet of jet 108b to be oriented anywhere within a hemisphere defined by the surface of channel surface 102 or gradient section 104. Moreover, the jets 108b are not limited to being oriented only in the above-described hemisphere, as the inventors contemplate that one or more of the jets 108b may be located above the surface of channel section 102 or gradient section 104 such that he outlet of jets 108b may have a range of greater than 180 degrees about the X-Y axis and thus have a range greater than a hemisphere. In this regard, the flow head outlet may be located above (spaced apart) from the local surface 102 or 104. The jets 108b may each a flow head having only one outlet, outlets in a cluster configuration, outlets in grids, or any combination thereof. For flow heads of the jets 108b having more than one outlet, the direction of the flow outlet may be averaged among the outlets. The movement of the jets 108b such that the orientation of the flow head outlet may be achieved by manually setting the direction or by an actuator, such as any type of electronic, pneumatic, or hydraulic actuator, or by any other automated means, according input from the control system, as defined more fully below.

Jets 108b may be formed of conventional materials, such as a plastic (including for example PVC), suitable metal, or a combination of materials. The particular design characteristics of jets 108b may be chosen according to conventional hydrodynamic principles in view of the present disclosure. The inventors surmise that the outlet diameters and/or flow rates of the heads of jets 108b be at least one inch diameter and/or 10 GPM to, as an upper limit, virtually any practical size or flow rate, as needed by the particular parameters of the structure and desired wave characteristics. The water source for jets 108b can be conventional, such pre-existing head pressure or a pump (not shown in the figures) of any type, such as positive pressure, centrifugal, diaphragm, peristaltic, magnetic, and/or voraxial type pump.

The pumps may be submersible or land-based, and thus may be proximate to jets 108b or remote to jets 108b, and/or may be waterproof or non-waterproof, and/or explosion proof or non-explosion proof, in any combination. Each jet 108b may have its own pump, a pump system may supply water to an several pumps in a network, or a single pump system may supply all jets 108b.

By using flow meters 108a positioned across the entire surface of the gradient section 104 and at varying depths in the deeper parts of the channel section 102, a current velocity profile can be attained while no reverse current has been applied. By creating an exact copy of this current velocity profile, but in the opposite direction, then the wave-created current can be negated exactly, and with minimal turbulence.

The monitoring of the direction and/or magnitude of the flow may be performed by any type of flow meter, such as a turbine or vane or other mechanical type, laser or other optical type, doppler flow meters and the like. Dye or particles may be employed with corresponding flow metering technology. The flow meters may employing any digital or analog flow metering technology, and the control and sampling of the flow may be by any algorithm or technique, including employing conventional machine learning techniques, as will be understood by persons familiar with flow sensing technology.

Communication between flow meters 108a and a controller, between jets 108b (including pumps associated with the jets, actuators, dampers or valves, and positions indicators or other sensors, such as those for any of the preceding components), and/or between flow meters 108a and jets 108b may be performed by any means. For example, wireless communication can be via Bluetooth or other radio wave means, wi-fi (such as via a local area network), cellular network (such as a cellemetry-type system), telemetry, or other communication means. Wired communication may be via traditional metal wire, fiber-optics, or other wiring means. Further, piping may carry signals through pneumatic or hydraulic means, such as pressure pulses through a fluid.

The partnering of an array of flow meters 108a with an array of current-creating jets 108b, and association with computer software, offers the potential to monitor and then control the formation of currents in all directions at all times according to preset requirements. As previously noted, the processor may rely on software that employs algorithms and formulae to effectively 'fill in' voids based on current fluid dynamics modelling for closed bodies of water. It should further be noted that as each wave passes over the flow meters 108a there will be a peak in the current velocity profile which will marginally decrease over the next several seconds until the next wave passes. As such, the affected jets 108b must produce an additional pulse to negate the additional current velocity generated as the wave passes, followed by a decreasing response until the next wave passes, at which time another pulse must be generated.

As noted above, and as illustrated in FIGS. 3A to 3D, the invention may also be used to enhance wave shape, by controlling the breadth, speed and angle of water currents relative to each wave. In that regards, users value waves that change shape, especially when a wide range of shapes can be produced. The present invention may serve this purpose by producing a range of currents of different strengths and directions, in different locations and at different times within a body of water, so that waves intersecting the currents change shape in ways that suit surfing performance.

For example, when a wave is travelling through a body of water moving in the opposite direction, the sloping portion of the wave becomes steeper due to its wavelength being compressed. Conversely, when a wave is travelling through a body of water moving in the same direction, the sloping portion of the wave becomes less steep, due to its wavelength being stretched.

Moreover, the change in slope is proportional to the speed of the current. Since water currents affect wave shape in a similar way to bathymetry, the ability to manipulate their speed and direction enables operators to enhance, or negate, the role of bathymetry in a wave pool. For example, waves can be forced to break in deep water, i.e. before entering shallow water, where bathymetry takes effect. Conversely, the effect of bathymetry can be reduced in waves moving through shallow water, preventing them from breaking.

The ability to influence when and where waves break, independently of pool bathymetry, enables operators to mimic a wide range of surf break bathymetries, without needing to replicate their actual bathymetries. For instance, a narrow current of water 302 can temporarily interfere with a wave front 300, by occupying a location through which the wave front 300 passes. A series of such currents can produce a sequence of wave shapes depending on their location, speed and direction, relative to an advancing wave front. Alternatively, a narrow current of water can continually interfere with a moving section of wave front, by repositioning the current in phase with the wavefront.

Since the steepness of a wave makes it more challenging to ride, the ability to adjust wave steepness allows the wave pool operator to cater for different levels of surfing ability. For example, when a current flows with a wave, the steepness of the wave is reduced, making it more suitable for beginners. By contrast, when a current flows against an oncoming wave, the steepness of the wave is increased, making it more suitable for experienced surfers. This phenomenon is often observed in near-shore environments, where incoming waves meet outgoing water.

Pressurized water is released from a series of jets positioned on or near to the pool floor and aligned parallel to the contours of bathymetry to create the current 302. This series of jets may be duplicated to form an array that partially blankets the floor and/or walls of the pool, with each unit recessed within or else standing proud of the surface upon which it is mounted. The speed and direction of water flowing through each water jet can be independently adjusted, to enable operators to choreograph sets of jets to produce currents that influence the shape of waves intersecting the currents.

The ability to manipulate current location, duration, speed and direction provides wave pool operators with an efficient means of sculpting waves to meet a wide variety of surfing needs. The precise manipulation of water currents also enables wave pool operators to neutralize undesirable currents by counteracting their motion, with the creation of another current of equal strength, flowing in the same location, but in the opposite direction.

Throughout this specification, unless the context requires otherwise, the word "comprise", or variations such as "comprises" or "comprising", will be understood to imply the inclusion of a stated step or element or integer or group of steps or elements or integers, but not the exclusion of any other step or element or integer or group of steps, elements or integers. Thus, in the context of this specification, the term "comprising" is used in an inclusive sense and thus should be understood as meaning "including principally, but not necessarily solely".

Unless the context requires otherwise or specifically stated to the contrary, integers, steps or elements of the invention recited herein as singular integers, steps or elements clearly encompass both singular and plural forms of the recited integers, steps or elements.

It will be appreciated that the foregoing description has been given by way of illustrative example of the invention and that all such modifications and variations thereto as would be apparent to persons of skill in the art are deemed to fall within the broad scope and ambit of the invention as herein set forth. Further, the present invention is not intended to be limited to the illustrative examples of technology that may be employed.

The invention claimed is:

1. A current control system for a wave pool comprising:
   an array of flow meters disposed within said wave pool;
   a complimentary array of current generators disposed within said wave pool; and
   a processor operable to receive data relating to currents within said wave pool from said array of flow meters, wherein said processor is operable to control currents generated by said array of current generators in response to said data relating to currents within said wave pool received from said array of flow meters.

2. A current control system according to claim 1, wherein said wave pool comprises a channel section and a shallower gradient section associated with the channel section, and wherein said flow meters are disposed across the surface of the gradient section.

3. A current control system according to claim 2, wherein flow meters are disposed on a floor of the channel section.

4. A current control system according to claim 2, wherein flow meters are disposed at varying depths within the channel section.

5. A current control system according to claim 2, wherein said current generators are disposed across the surface of the gradient section.

6. A current control system according to claim 5, wherein said current generators are disposed on a floor of the channel section.

7. A current control system according to claim 6, wherein said current generators are disposed at varying depths within the channel section.

8. A current control system according to claim 2, wherein said array of flow meters comprises an array of turbine flow meters, Doppler flow meters and/or laser flow meters.

9. A current control system according to claim 2, wherein said array of current generators comprises an array of jets.

10. A current control system according to claim 9, wherein at least some of said jets are adapted to be positionable according to signals from the processor.

11. A current control system according to claim 10 wherein at least a portion of said jets are adapted to be positionable over at least 45 degrees about a Z-axis and at least 45 degrees about an X-Y axis that is perpendicular to the Z-axis.

12. A current control system according to claim 11 wherein at least a portion of said jets are adapted to be positionable over at least 90 degrees about a Z-axis and at least 90 degrees about an X-Y axis that is perpendicular to the Z-axis.

13. A current control system according to claim 2, wherein said processor is operable to receive said data relating to currents within said wave pool from said array of flow meters and generate a current velocity profile within at least a portion of said wave pool.

14. A current control system according to claim 13, wherein said processor is operable to cause said array of current generators to generate a corresponding negative current velocity profile within said portion of the wave pool, thereby negating currents within the portion of the wave pool.

15. A current control system according to claim 13, wherein said processor is operable to cause said array of current generators to generate a complimentary current velocity profile that modifies waves formed within the wave pool.

16. A wave pool comprising:
    a pool structure adapted for enable waves; and
    a current control system of claim 1.

17. A method of controlling currents within a wave pool comprising:
    measuring currents within said wave pool with an array of flow meters disposed within said wave pool;
    determining a current velocity profile within at least a portion of said wave pool; and
    based on said current velocity profile, adjusting currents within at least the portion of the wave pool with an array of current generators disposed within said wave pool.

18. A method according to claim 17, wherein said step of determining the current velocity profile comprises the step of transmitting data relating to currents within the wave pool from said array of flow meters to a processor and determining the current velocity profile based on that data.

19. A method according to claim 17, wherein said step of adjusting of currents within the wave pool comprises the step of causing said array of current generators to generate a corresponding negative current velocity profile within said portion of the wave pool, thereby negating currents within the portion of the wave pool.

20. A method according to claim 17, wherein said step of adjusting currents within the wave pool comprises the step of causing said array of current generators to generate a complimentary current velocity profile that modifies waves formed within said wave pool.

\* \* \* \* \*